United States Patent
Yeh et al.

(10) Patent No.: US 7,136,124 B2
(45) Date of Patent: Nov. 14, 2006

(54) TRANSFLECTIVE LIQUID CRYSTAL DISPLAY DEVICE USING TRANSFLECTIVE COLOR FILTER AND METHOD FOR MAKING COLOR FILTER

(75) Inventors: Sheng-Shiou Yeh, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 49 days.

(21) Appl. No.: 10/858,916

(22) Filed: Jun. 1, 2004

(65) Prior Publication Data
US 2004/0239848 A1    Dec. 2, 2004

(30) Foreign Application Priority Data
May 30, 2003    (TW) .................................. 9211484 A

(51) Int. Cl.
*G02F 1/1335* (2006.01)
(52) U.S. Cl. ..................... 349/114; 349/106; 349/112
(58) Field of Classification Search ............. 349/106, 349/114
See application file for complete search history.

(56) References Cited

U.S. PATENT DOCUMENTS

| 6,476,889 | B1 * | 11/2002 | Urabe et al. ............. 349/106 |
| 6,522,377 | B1 | 2/2003 | Kim et al. |
| 2002/0063834 | A1 * | 5/2002 | Sawasaki et al. ........... 349/130 |
| 2002/0075429 | A1 * | 6/2002 | Fujioka et al. .............. 349/106 |
| 2004/0056999 | A1 * | 3/2004 | Ko et al. .................... 349/114 |

* cited by examiner

*Primary Examiner*—Andrew Schechter
*Assistant Examiner*—W. Patty Chen
(74) *Attorney, Agent, or Firm*—Wei Te Chung

(57) ABSTRACT

A color filter (401) for a transflective liquid crystal display (LCD) includes a transparent substrate (4011), a color filter layer (4012) covering the transparent substrate, a transparent electrode (4013) covering the color filter layer, and a transparent layer (4014). The color filter layer comprises a plurality of color units (4015). Each color unit has a first overlapping portion (4015a), a second overlapping portion (4015b) and a middle portion (4015c) therebetween, and the first overlapping portions of color units are formed on second overlapping portions of contiguous color units to form a plurality of light blocking areas, the middle portion of each color unit has a first portion (r) that corresponds to a reflective mode, and a second portion (t) that corresponds to a transmissive mode. The second portion is thicker than the first portion. A transflective LCD using the color filter is also described.

8 Claims, 6 Drawing Sheets

TRANSFLECTIVE LIQUID CRYSTAL DISPLAY DEVICE USING TRANSFLECTIVE COLOR FILTER AND METHOD FOR MAKING COLOR FILTER

BACKGROUND OF THE INVENTION

1. Field of the Invention

The present invention relates to liquid crystal displays, and more particularly to transflective liquid crystal display devices.

2. Description of the Prior Art

Liquid crystal display (LCD) devices are in wide use as display devices capable of reducing the overall size, weight and thickness of electronic apparatuses in which they are employed. In general, LCD devices are divided into two categories—transmissive LCD devices and reflective LCD devices—according to whether the display uses an included or an external light source.

A transmissive LCD device displays images using light from a back light device, and is usable under any ambient light conditions. Because the transmissive LCD device requires a back light having high brightness, it has high power consumption. Further, the back light device cannot be used for a long time.

Unlike the transmissive LCD device, a reflective LCD device utilizes ambient light beams from a natural light source or from an external artificial light source. The reflective LCD device can be used for a long time. However, the reflective LCD device is useless when the weather is unfavorable or when the external light source is not available.

To overcome the problems described above, a transflective LCD device has been developed. The transflective LCD device can compensate for the respective shortcomings of the reflective LCD device and the transmissive LCD device. That is, the transflective LCD device can selectively provide a reflective or transmissive mode, depending on the prevailing needs of users.

FIG. 8 is a schematic cross-sectional view of part of a conventional transflective LCD device 1. For the sake of convenience, just one sub-pixel portion of the transflective LCD device 1 is shown. The transflective LCD device 1 includes an upper plate 10 having a color filter 101, a lower plate 12 spaced apart from the upper plate 10, a liquid crystal layer 11 between the upper plate 10 and the lower plate 12, and a back light 13 disposed below the lower plate 12.

Referring also to FIG. 9, in the transflective LCD device 1, a conventional color filter 101 is employed. The color filter 101 includes an upper transparent substrate 1011, a color filter layer 1012, and a transparent electrode 1013. The color filter layer 1012 includes a plurality of black matrix units 1015 regularly disposed on the upper transparent substrate 1011, and color units 1014 covering the black matrix units 1015. The color units 1014 are divided into red "R," green "G" and blue "B" color units 1014. In the upper plate 10, the color filter layer 1012 is formed on a bottom surface of the transparent substrate 1011, and the upper transparent electrode 1013 is formed on a bottom of the color filter layer 1012. The upper transparent electrode 1013 serves as a common electrode. In addition, a half wave plate 102 is formed as a retardation film on a top surface of the transparent substrate 1011, and an upper polarizer 103 is formed on the half wave plate 102.

In the lower plate 12, an insulating layer 122 is formed on a top surface of a lower transparent substrate 121, and a lower transparent electrode 123 is formed on the insulating layer 122. A passivation layer 124 is formed on the lower transparent electrode 123, and a reflective electrode 125 is formed on the passivation layer 124. A transmitting hole 126 is defined through the passivation layer 124 and the reflective electrode 125. A lower polarizer 120 is formed on a bottom surface of the lower transparent substrate 121.

The transflective LCD device 1 has a transmissive portion "T" that corresponds to a portion of the lower transparent electrode 123 exposed via the transmitting hole 126, and a pair of reflective portions "R" that correspond to the reflective electrode 125. The transmissive portion "T" has a first cell gap "a" between the upper transparent electrode 1013 and the lower transparent electrode 123. The reflective portions "R" have a second cell gap "b" between the upper transparent electrode 1013 and the reflective electrode 125. The first cell gap "a" is configured to be larger than the second cell gap "b," such that incident light rays have the same efficiency for the transmissive and reflective modes. Specifically, the first cell gap "a" is preferably about twice as large as the second cell gap "b."

In the reflective mode, an ambient light ray "d" from an external light source such as natural sunlight passes through the upper polarizer 103, the half wave plate 102, the color filter 101 and the liquid crystal layer 11 in that order, and is then reflected by the reflective electrode 125 to pass back through the liquid crystal layer 11, the color filter 101, the half wave plate 102 and the upper polarizer 103 in that order. That is, the ambient light ray "d" passes through the color filter 101 twice.

In the transmissive mode, an incident light ray "c" from the back light 13 passes through the lower polarizer 120, the transparent substrate 121, the insulating layer 122, the lower transparent electrode 123, the liquid crystal layer 11, the color filter 101, the half wave plate 102 and the upper polarizer 103 in that order. That is, the incident light ray "c" passes through the color filter 101 only once.

The light ray "c" is only colored once by the color filter 101 in the transmissive mode, but the light ray "d" is colored twice by the color filter 101 in the reflective mode. Thus, in the transflective LCD device 1, the reflective mode has a better color purity than the transmissive mode. That is, there is a difference in color purity as between the reflective mode and the transmissive mode.

For the above reasons, an improved transflective LCD having high color purity is desired.

SUMMARY OF THE INVENTION

An object of the invention is to provide a color filter for a transflective liquid crystal display which has high color purity.

Another object of the invention is to provide a transflective liquid crystal display device having high color purity.

A further object of the invention is to provide a method for fabricating a color filter for a transflective LCD device, in which the color filter has high color purity.

In order to achieve the objects set forth above, the present invention provides a color filter for a transflective liquid crystal display includes a transparent substrate, a color filter layer covering the transparent substrate, a transparent electrode covering the color filter layer, and a transparent layer. The color filter layer comprises a plurality of color units. Each color unit has a first overlapping portion, a second overlapping portion and a middle portion therebetween, and the first overlapping portions of color units are formed on second overlapping portions of contiguous color units to form a plurality of light blocking areas, the middle portion of each color unit has a first portion that corresponds to a reflective mode, and a second portion that corresponds to a transmissive mode, and the second portion is thicker than the first portion.

Further, the present invention provides a transflective liquid crystal display device which includes: an upper plate having a color filter and a lower plate having lower transparent electrodes and reflective electrodes alternately arranged therein; a liquid crystal layer interposed between the upper and lower plate. The color filter comprises a transparent substrate, a color filter layer covering the transparent substrate, an upper transparent electrode layer covering the color filter layer, and a transparent layer covering the transparent electrode layer. The color filter layer comprises a plurality of color units, each color unit includes a first portion and a second portion, with the second portion being thicker than the first portion. The first portion of each color filter corresponds to a respective reflective electrode, and the second portion of each color filter corresponds to a respective lower transparent electrode.

In a transmissive mode, an incident light ray passes through the color filter only once. In a reflective mode, an ambient light ray passes through the color filter twice. In the transmissive mode, the thickness of the color unit where the incident light ray passes therethrough once is twice the thickness of the color unit where the ambient light ray passes therethrough twice in the reflective mode. That is, there is identical color purity as between the reflective mode and the transmissive mode.

Further, the present invention provides a method for fabricating a color filter for a transflective LCD device, the method comprising: providing a substrate; repeatedly depositing a plurality of color resins on the substrate such that parts of red, green, and blue color units are formed, wherein parts of each color unit comprise a middle portion and a second overlapping portion; repeatedly depositing a plurality of color resins such that first overlapping portions of red, green, and blue color units are formed on the second overlapping portions of respective contiguous blue, red, and green color units, each color unit having a first portion that corresponds to a reflective mode and a second portion that corresponds to a transmissive mode, the second portion being approximately twice as thick as the first portion; depositing an upper transparent electrode on the color units such that a uniform surface is formed; and forming a transparent layer on said uniform surface of the upper transparent electrode layer.

Other objects, advantages and novel features of the invention will become more apparent from the following detailed description of preferred embodiments of the invention as illustrated in the accompanying drawings, in which:

BRIEF DESCRIPTION OF THE INVENTION

DETAILED DESCRIPTION OF THE INVENTION

Reference will be made to the drawings to describe the invention in detail.

Figure 1:
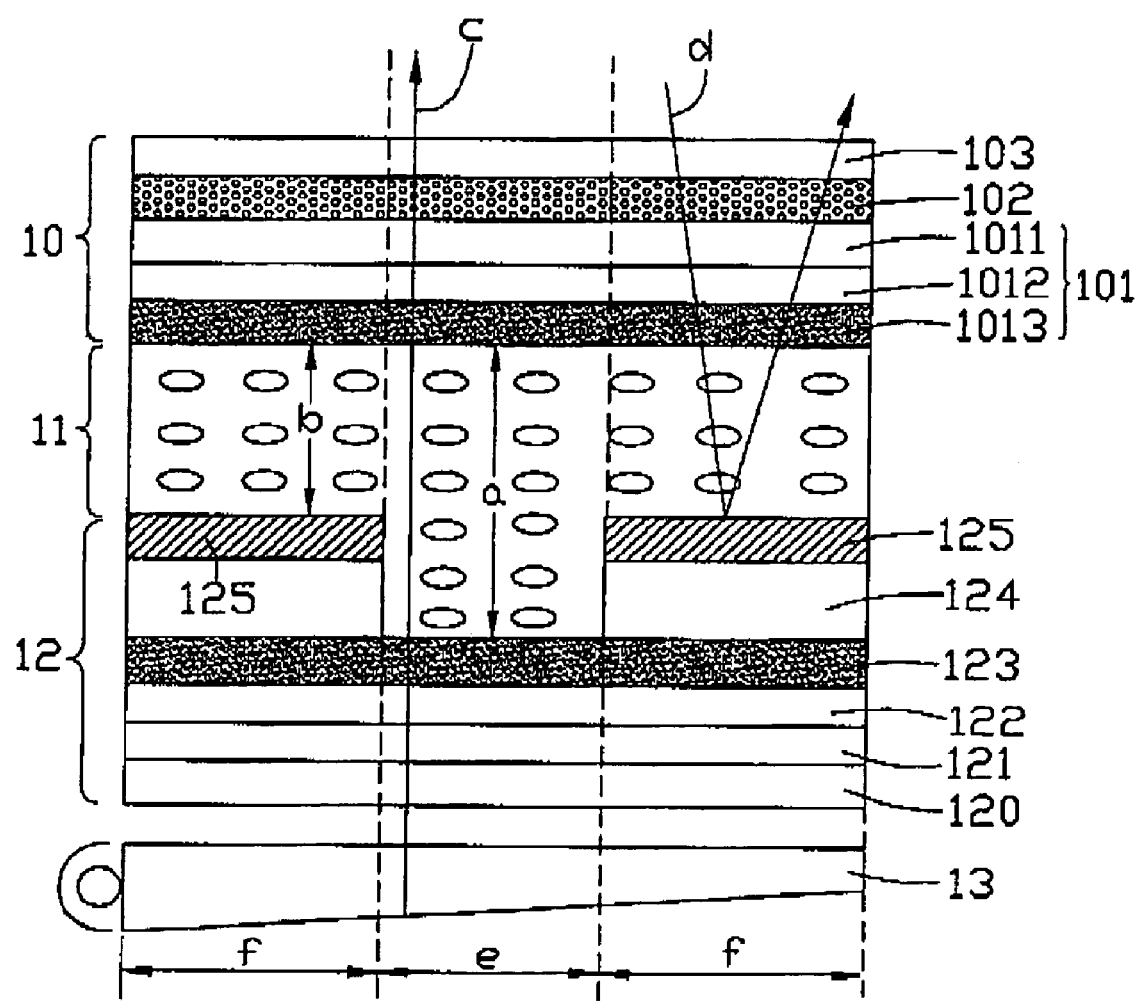
FIG. 1 is a schematic, cross-sectional view showing one sub-pixel of a first embodiment of a transflective liquid crystal display device according to the present invention.

FIG. 1 illustrates part of a transflective liquid crystal display (LCD) device 2 according to the first embodiment of the present invention. For the sake of convenience, only one sub-pixel of the transflective LCD device 2 is shown. The transflective LCD device 2 includes an upper plate 20, a lower plate 22, a liquid crystal layer 21 interposed therebetween, and a back light (not shown) disposed below the lower plate 22.

Figure 2:
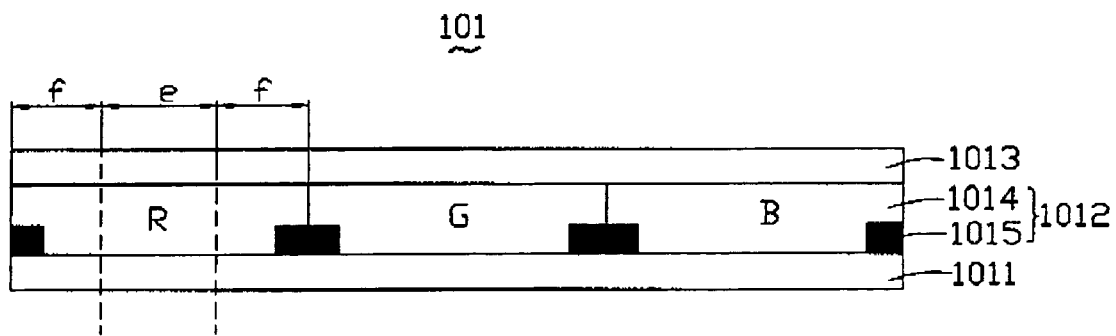
FIG. 2 is an enlarged, schematic, cross-sectional view showing one pixel of a first color filter of the transflective liquid crystal display device of FIG. 1, but with the first color filter inverted.

In the upper plate 20, a first color filter 201, a half wave plate 202 and an upper polarizer 203 are stacked sequentially. Referring also to FIG. 2, for the sake of convenience, just one pixel of the first color filter 201 is shown. In general, one pixel comprises three sub-pixels. The first color filter 201 includes a transparent substrate 2011, a color filter layer 2012, an upper transparent electrode layer 2013, and a transparent layer 2014. The color filter layer 2012 is formed on a bottom surface (not labeled) of the transparent substrate 2011, and includes a plurality of black matrix units 2016 and a plurality of color units 2015. Each black matrix unit 2016 serves to protect a thin film transistor (not shown) from being irradiated by incident light rays. In addition, the black matrix unit 2016 serves to prevent leakage of the incident light through intervals between electrical lines formed on the lower plate 22. Each color unit 2015 has two first portions "r" and a second portion "t" between the first portions "r." The second portion "t" of each color unit 2015 is preferably twice as thick as the first portions "r" of each color unit 2015. The upper transparent electrode layer 2013 completely underlays a plurality of color units 2015, and serves as a common electrode. The transparent layer 2014 is formed on a bottom of the upper transparent electrode layer 2013. In the upper plate 20, the half wave plate 202 is formed as a retardation film on a top surface of the transparent substrate 2011, and the upper polarizer 203 is formed on the half wave plate 202.

The lower plate 22 includes a transparent substrate 221, a lower electrode layer 225, and a lower polarizer 220. The lower electrode layer 225 comprises lower transparent electrodes 224 and reflective electrodes 223 alternately formed in a single plane on the transparent substrate 221. The lower transparent electrodes 224 are preferably made of a transparent conductive material. The reflective electrodes 223 are made of an opaque metal having a high reflectivity, such as aluminum (Al) or the like. The lower polarizer 220 is formed on a bottom surface of the transparent substrate 221.

In the transflective LCD device 2, each first portion "r" of each color unit 2015 corresponds to one respective reflective electrode 223, and the second portion "t" of each color unit 2015 corresponds to one respective lower transparent electrode 224.

In a transmissive mode, an incident light ray "g" from the back light 23 passes through the lower polarizer 220, the transparent substrate 221, the lower transparent electrode 224, the liquid crystal layer 21, the first color filter 201, the half wave plate 202 and the upper polarizer 203 in that order.

In a reflective mode, an ambient light ray "h" from an external light source such as natural sunlight passes through the upper polarizer 203, the half wave plate 202, the first color filter 201 and the liquid crystal layer 21 in that order, and is then reflected by the reflective electrode 223 to pass back through the liquid crystal layer 21, the first color filter 201, the half wave plate 202 and the upper polarizer 203 in that order.

In the transmissive mode, the incident light ray "g" passes through the first color filter 201 only once, and in the reflective mode the ambient light ray "h" passes through the first color filter 201 twice. The thickness of the color unit 2015 where the incident light ray "g" passes therethrough is twice the thickness of the color unit 2015 where the ambient light ray "h" passes therethrough. That is, there is identical color purity as between the reflective mode and the transmissive mode.

Figure 3:
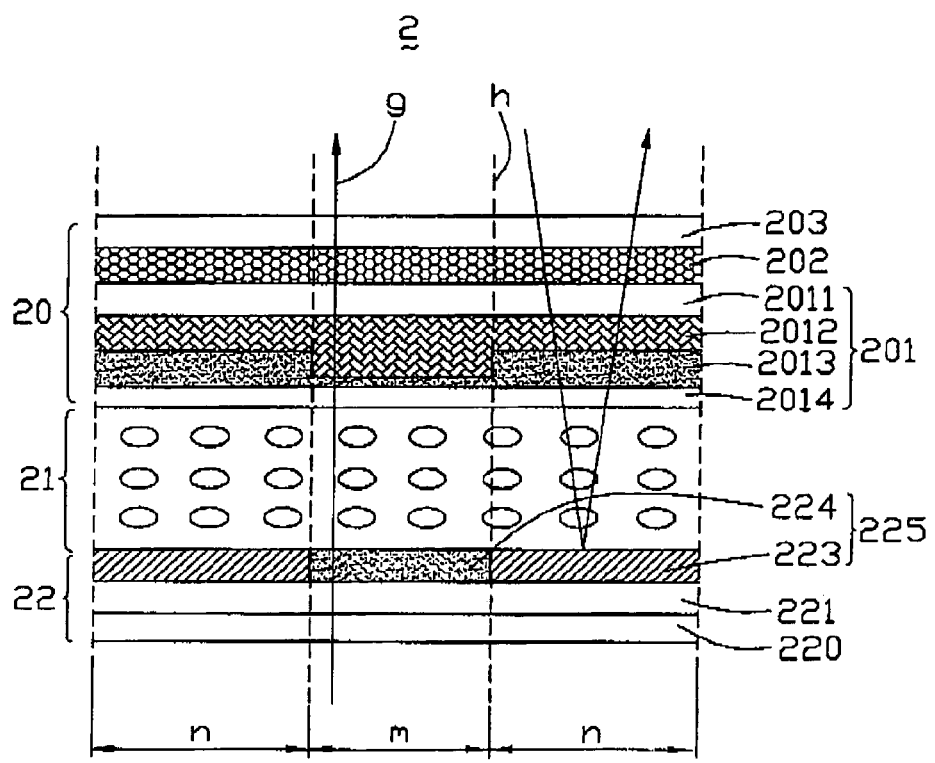
FIG. 3 is a schematic, cross-sectional, inverted view showing one pixel of a second color filter of a transflective liquid crystal display device according to a second embodiment of the present invention.

FIG. 3 shows part of a second color filter 301 of a transflective liquid crystal display device according to a second embodiment of the present invention. The second color filter 301 is similar to the first color filter 201 of the first embodiment, except that a plurality of convex protrusions 3017 corresponding to the first portions "r" is formed on a bottom surface (not labeled) of a transparent layer 3014. The convex protrusions 3017 are elongate and parallel to each other, and can readily gather incident light rays from different directions.

Figure 4:
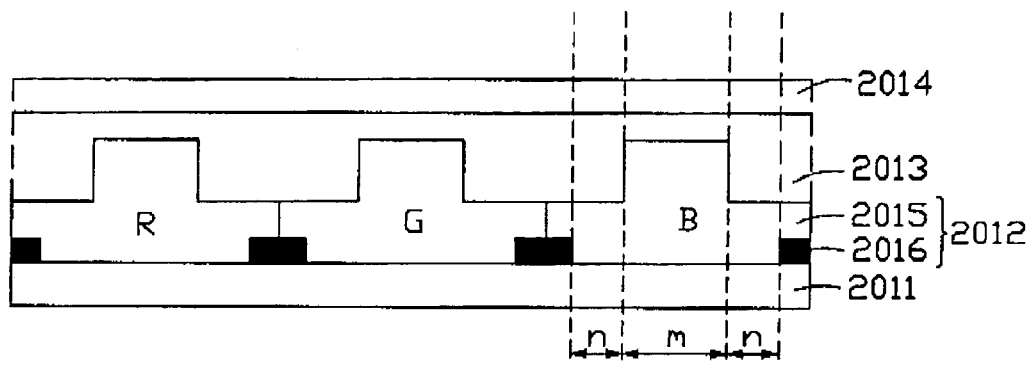
FIG. 4 is a schematic, cross-sectional, inverted view showing one pixel of a third color filter of a transflective liquid crystal display device according to a third embodiment of the present invention.

FIG. 4 shows part of a third color filter 401 of a transflective liquid crystal display device according to a third embodiment of the present invention. For the sake of convenience, just one pixel of the third color filter 401 is shown. In general, one pixel comprises three sub-pixels. The third color filter 401 includes a transparent substrate 4011, a color filter layer 4012, an upper transparent electrode layer 4013, and a transparent layer 4014. The color filter layer 4012 is formed on a bottom surface (not labeled) of the transparent substrate 4011, and includes a plurality of color units 4015 comprising red color units "R," green color units "G" and blue color units "B". Each color unit 4015 comprises a first overlapping portion 4015a, a second overlapping portion 4015b, and a middle portion 4015c therebetween. The first overlapping portions 4015a of color units 4015 overlap on the second overlapping portions 4015b of contiguous color units 4015 to form a plurality of light blocking areas (not labeled). The light blocking areas serve as conventional black matrix units for protecting a thin film transistor (not shown) from being irradiated by incident light rays. In addition, the blocking areas serve to prevent leakage of the incident light through intervals between electrical lines formed on the lower plate 22 (see FIG. 1). The middle portion 4015c of each color unit 4015 has two first portions "r" and a second portion "t" between the first portions "r." The second portion "t" of each middle portion 4015c is preferably twice as thick as the first portions "r" of each middle portion 4015c. The upper transparent electrode layer 4013 completely underlays a plurality of the color units 4015, and serves as a common electrode. The transparent layer 4014 is formed on a bottom of the upper transparent electrode layer 4013.

Figure 5:
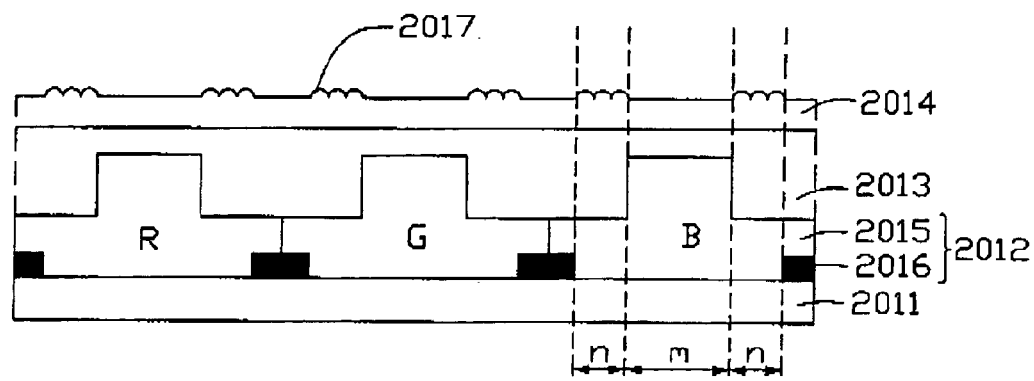
FIG. 5 is a schematic, cross-sectional, inverted view showing one pixel of a fourth color filter of a transflective liquid crystal display device according to a fourth embodiment of the present invention.

FIG. 5 shows a fourth color filter 501 of a transflective liquid crystal display device according to a fourth embodiment of the present invention. The fourth color filter 501 is similar to the third color filter 401 of the third embodiment, except that a plurality of convex protrusions 5017 corresponding to the first portions "r" is formed on a bottom surface (not labeled) of a transparent layer 5014. The convex protrusions 5017 are elongate and parallel to each other, and can readily gather incident light rays from different directions.

A preferred method for fabricating the third color filter 401 is provided as follows. First, part of each color unit 4015 comprising the middle portion 4015c and a second overlapping portion 4015b are formed on the transparent substrate 2011. To fabricate red color units 4015, a viscous resin admixed with a red dye is deposited on the transparent substrate 4011. Then the resin is exposed using a color-resist, and developed such that the red color units "R" are formed. A negative color-resist is preferably used for the exposing procedure. After the parts of red color units "R" are formed, the green color units "G" and the blue color units "B" are sequentially formed by repeating the above-described procedures, with due alteration of details.

Second, a first overlapping portion 4015a of each color unit 4015 is formed on the second overlapping portion 4015b of a contiguous color unit 4015. That is, the first overlapping portions 4015a of the red color units "R" are formed on the second overlapping portions 4015b of the blue color units "B," the first overlapping portions 4015a of the green color units "G" are formed on the second overlapping portions 4015b of the red color units "R," and the first overlapping portions 4015a of the blue color units "B" are formed on the second overlapping portions 4015b of the green color units "G." Furthermore, the middle portion 4015c of each color unit 4015 has the two first portions "r" that correspond to a respective pair of reflective electrodes 223, and has the second portion "t" that corresponds to a respective lower transparent electrode 224 (see FIG. 1). The second portion "t" is twice as thick as the first portions "r." The color filter layer 4012 is thus formed.

Third, the upper transparent electrode layer 4013 is formed on the color filter layer 4012. To fabricate the upper transparent electrode layer 4013, a transparent conductive material is deposited on the inmost portions of the color units 4015. That is, gaps between the color units 4015 are filled, such that the upper transparent electrode layer 2013 completely underlays the color units 4015 such that a uniform surface is formed.

Finally, the transparent layer 4014 is formed on said uniform surface of the upper transparent electrode layer.

Figure 6:
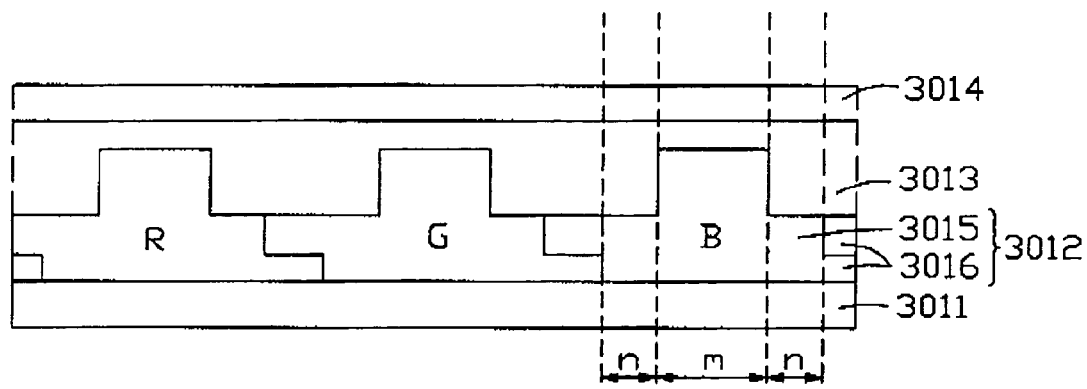
FIG. 6 is a schematic, cross-sectional view showing one sub-pixel of a fifth embodiment of a transflective liquid crystal display device according to the present invention.

FIG. 6 shows part of a transflective LCD device 5 of a fifth embodiment of the present invention. The transflective LCD device 5 is similar to the transflective LCD device 2 of the first embodiment except that in an upper plate 50, a quarter wave plate 502 is interposed between an upper polarizer 503 and a half wave plate 504. The quarter wave plate 502 provides a phase difference of "$\lambda/4$" such that incident linearly polarized light rays are changed to circularly polarized light rays when they pass therethrough.

Figure 7:
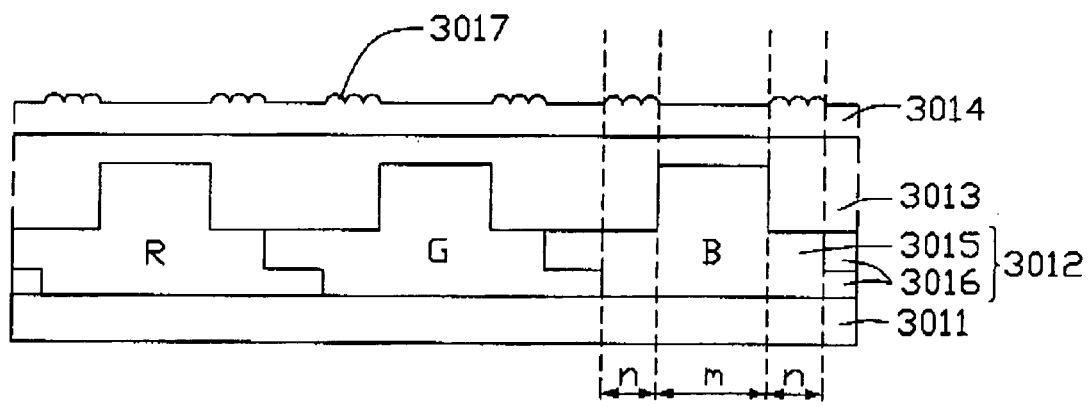
FIG. 7 is a schematic, cross-sectional view showing one sub-pixel of a sixth embodiment of a transflective liquid crystal display device according to the present invention.
Figure 8:
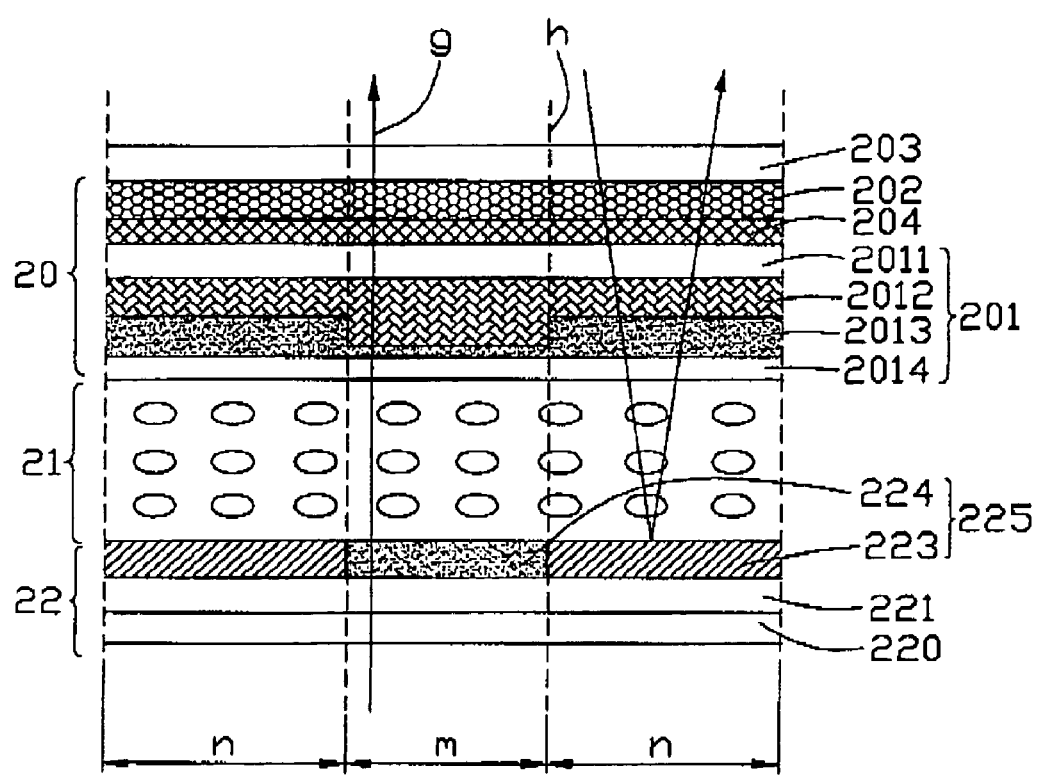
FIG. 8 is a schematic, cross-sectional view showing one sub-pixel of a conventional transflective liquid crystal display device.
Figure 9:
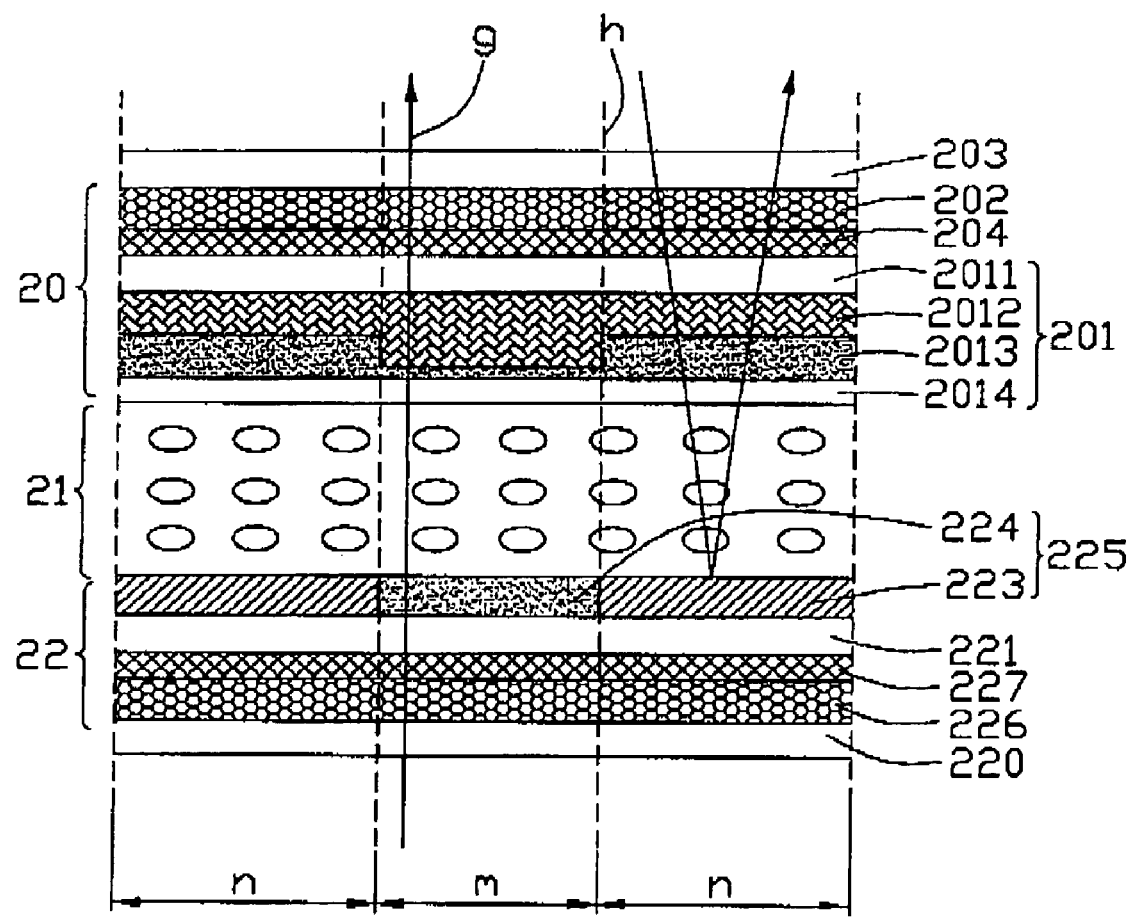
FIG. 9 is an enlarged, schematic, cross-sectional view showing one pixel of a color filter of the transflective liquid crystal display device of FIG. 8, but with the color filter inverted.

FIG. 7 shows part of a transflective LCD device 6 of a sixth embodiment of the present invention. The transflective LCD device 6 is similar to the transflective LCD device 5 of the fifth embodiment, except that a half wave plate 626 and a quarter wave plate 627 are interposed between a lower polarizer 620 and a lower transparent substrate 621.

It will be appreciated that in further embodiments of the present invention, any of the color filters 201, 301, 401, 501 can be used in either of the transflective LCD devices 6, 7.

The color filters 201, 301, 401, 501 have a common feature. That is, each color unit has a first portion "r" and a second portion "t," with the second portion "t" preferably being twice as thick as the first portion "r." In the transflective LCD device 2 employing any of the color filters 201, 301, 401, 501, the first portion "r" of each color unit corresponds to a respective reflective electrode 223, and the second portion "t" of each color unit corresponds to a respective lower transparent electrode 224.

In the transmissive mode, the incident light ray ("g" in FIG. 1) passes through the color filter 201, 301, 401, 501 only once, and in the reflective mode the ambient light ray ("h" in FIG. 1) passes through the color filter 201, 301, 401, 501 twice. In the transmissive mode, the thickness of the color unit where the incident light ray "g" passes through is twice as great as the thickness of the color unit where the ambient light ray "h" passes through. Thus, there is identical color purity as between the reflective mode and the transmissive mode.

It is to be understood, however, than even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the extent indicated by the broad general meaning of the terms in which the appended claims are expressed.

What is claimed is:

1. A transflective liquid crystal display device comprising:
   an upper plate having a color filter;
   a lower plate having a lower electrode layer comprising lower transparent electrodes and reflective electrodes alternately arranged therein; and
   a liquid crystal layer interposed between the upper plate and the lower plate,
   wherein the color filter comprises a transparent substrate, a color filter layer covering the transparent substrate, an upper transparent electrode layer covering the color filter layer, and a transparent layer covering the transparent electrode layer, the color filter layer comprises a plurality of color units, each color unit having a first portion and a second portion, the second portion being thicker than the first portion, the first portion of each color unit corresponding to a respective reflective electrode, the second portion of each color unit corresponding to a respective lower transparent electrode, and the transparent layer comprises a plurality of convex protrusions formed on a bottom surface thereof facing the liquid crystal layer, the plurality of convex protrusions corresponding to the reflective electrodes.

2. The transflective liquid crystal display device as described in claim 1, wherein the second portion of each color unit is approximately twice as thick as the first portion of the color unit.

3. The transflective liquid crystal display device as described in claim 1, wherein each color unit further comprises a first overlapping part, a second overlapping part, and a middle part.

4. The transflective liquid crystal display device as described in claim 3, wherein the first overlapping part of each color unit overlaps the second overlapping part of a contiguous color unit.

5. A color filter for a transflective liquid crystal display, comprising:
   a transparent substrate,
   a color filter layer covering the transparent substrate,
   a transparent electrode layer covering the color filter layer, and
   a transparent layer covering the transparent electrode layer, the transparent layer comprising a plurality of convex protrusions formed on a bottom surface thereof,
   wherein the color filter layer comprises a plurality of color units, each color unit has a first overlapping portion, a second overlapping portion and a middle portion therebetween, and the first overlapping portions of color units are formed on the second overlapping portions of contiguous color units to form a plurality of light blocking areas, the middle portion of each color unit has a first portion that corresponds to a reflective mode, and a second portion that corresponds to a transmissive mode, the second portion is thicker than the first portion and the convex protrusions correspond to the first portions of the color units.

6. The color filter as described in claim 5, wherein the second portion is approximately twice as thick as the first portion.

7. A method for fabricating a color filter for a transflective liquid crystal display device, the method comprising:
   providing a substrate;
   repeatedly depositing a plurality of color resins on the substrate such that parts of red, green, and blue color units are formed, wherein each part comprises a middle portion and a second overlapping portion;
   repeatedly depositing a plurality of color resins such that first overlapping portions of red, green, and blue color units are formed on the second overlapping portions of respective contiguous blue, red, and green color units, each color unit having a first portion that corresponds to a reflective mode and a second portion that corresponds to a transmissive mode, the second portion being thicker than the first portion;
   depositing an upper transparent electrode on the color units such that a uniform surface is formed; and
   forming a transparent layer on said uniform surface of the upper transparent electrode layer, the transparent layer formed with a plurality of convex protrusions on a bottom surface thereof, wherein the convex protrusions correspond to the first portions of the color units.

8. The method for fabricating the color filter as described in claim 7, wherein the second portions are approximately twice as thick as the first portions.

* * * * *